US009463562B2

(12) United States Patent
Gumpert et al.

(10) Patent No.: US 9,463,562 B2
(45) Date of Patent: Oct. 11, 2016

(54) MOTOR DRIVEN HAMMER HAVING MEANS FOR CONTROLLING THE POWER OF IMPACT

(75) Inventors: Rene Gumpert, Idstein (DE); Heinz-Werner Faatz, Schmitten (DE)

(73) Assignee: Black & Decker Inc., New Britain, CT (US)

( * ) Notice: Subject to any disclaimer, the term of this patent is extended or adjusted under 35 U.S.C. 154(b) by 800 days.

(21) Appl. No.: 12/836,635

(22) Filed: Jul. 15, 2010

(65) Prior Publication Data

US 2011/0011607 A1 Jan. 20, 2011

(30) Foreign Application Priority Data

Jul. 15, 2009 (GB) .................................. 0912283.9

(51) Int. Cl.

| | |
|---|---|
| ***B23B 45/16*** | (2006.01) |
| ***E21B 1/22*** | (2006.01) |
| ***B25D 11/06*** | (2006.01) |
| ***B25D 11/00*** | (2006.01) |
| ***B25D 11/12*** | (2006.01) |

(52) U.S. Cl.

CPC ........... *B25D 11/064* (2013.01); *B25D 11/005* (2013.01); *B25D 11/125* (2013.01); *B25D 2211/003* (2013.01); *B25D 2217/0023* (2013.01); *B25D 2250/025* (2013.01)

(58) Field of Classification Search

CPC ........................... B25D 11/064; B25D 11/005

USPC .......... 173/90, 104, 112, 114, 117, 127, 206, 173/210, 212, 217; 227/131

See application file for complete search history.

(56) References Cited

U.S. PATENT DOCUMENTS

| | | | | |
|---|---|---|---|---|
| 4,618,087 | A * | 10/1986 | Lai | 227/131 |
| 6,015,017 | A * | 1/2000 | Lauterwald | 173/48 |
| 6,112,830 | A * | 9/2000 | Ziegler et al. | 173/109 |
| 6,201,362 | B1 * | 3/2001 | DeMichelis | 318/126 |
| 6,454,021 | B1 * | 9/2002 | Watanabe | 173/114 |
| 6,739,405 | B2 * | 5/2004 | Plietsch | 173/201 |
| 7,216,723 | B2 * | 5/2007 | Ohtsu et al. | 173/2 |
| 7,296,635 | B2 * | 11/2007 | Droste | 173/48 |
| 7,383,893 | B2 * | 6/2008 | Shimma et al. | 173/48 |

(Continued)

FOREIGN PATENT DOCUMENTS

| | | |
|---|---|---|
| DE | 19855750 | 6/2000 |
| EP | 1070569 | 1/2001 |

(Continued)

*Primary Examiner* — Gloria R Weeks
*Assistant Examiner* — Eyamindae Jallow
(74) *Attorney, Agent, or Firm* — Adan Ayala

(57) ABSTRACT

A motor driven hammer having a housing, a motor having a motor shaft and being arranged in the housing, a hammer mechanism including a cylinder in which a ram is arranged the ram being slidable along a longitudinal axis (L) of the cylinder, and a tool holder which may support a tool bit so that the tool bit is aligned with the longitudinal axis of the cylinder, wherein the motor is coupled with the hammer mechanism, so that rotation of the motor shaft results in a reciprocating movement of the ram within the cylinder, the ram applying impacts on a tool bit supported by the tool holder during the reciprocating movement. Further, the ram is made of a paramagnetic or ferromagnetic material or comprises a permanent magnet and a coil is arranged within the housing adjacent to the cylinder so that the coil applies a force in the direction of the longitudinal axis on the ram if a current is applied to the coil.

12 Claims, 1 Drawing Sheet

(56) References Cited

U.S. PATENT DOCUMENTS

| | | | | |
|---|---|---|---|---|
| 2002/0014344 | A1* | 2/2002 | Geiger et al. | 173/114 |
| 2004/0238191 | A1* | 12/2004 | Shinagawa et al. | 173/93 |
| 2005/0167466 | A1* | 8/2005 | Tsai | 227/131 |
| 2005/0194420 | A1* | 9/2005 | Zahner et al. | 227/131 |
| 2008/0185418 | A1* | 8/2008 | Gross et al. | 227/113 |
| 2010/0032468 | A1* | 2/2010 | Gross et al. | 227/131 |

FOREIGN PATENT DOCUMENTS

| | | |
|---|---|---|
| EP | 1652629 | 5/2006 |
| FR | 1598403 | 8/1970 |
| JP | 2008-305688 A | 11/2006 |

* cited by examiner

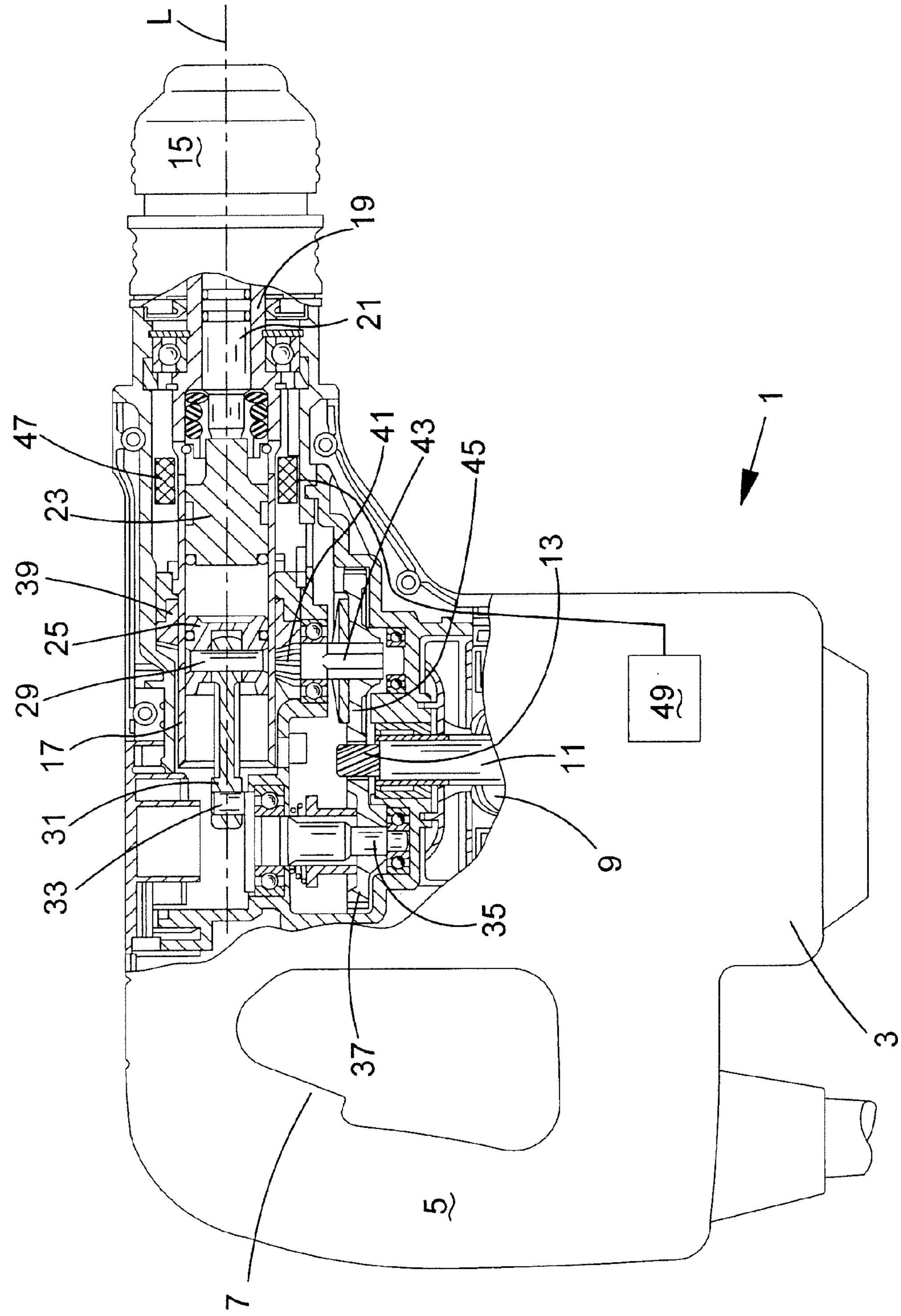
L
15
19
21
1
47
41
43
45
23
13
39
25
29
17
11
31
33
9
35
37
3
7
5
49

MOTOR DRIVEN HAMMER HAVING MEANS FOR CONTROLLING THE POWER OF IMPACT

CROSS-REFERENCE TO RELATED APPLICATIONS

This application claims priority, under 35 U.S.C. §119 (a)-(d), to UK Patent Application No. GB 0912283.9, filed Jul. 15, 2009 which is incorporated herein by reference in its entirety.

FIELD OF THE INVENTION

The present invention relates to a motor driven hammer comprising a housing, a motor having a motor shaft and being arranged in the housing, a hammer mechanism including a cylinder in which a ram is arranged the ram being slidable along a longitudinal axis of the cylinder and a tool holder which is capable of supporting a tool bit so that the tool bit is aligned with the longitudinal axis of the cylinder, wherein the motor is coupled with the hammer mechanism, so that rotation of the motor shaft results in a reciprocating movement of the ram within the cylinder, the ram applying impacts on a tool bit supported by the tool holder during the reciprocating movement.

BACKGROUND OF THE INVENTION

Such a hammer which is known from EP 1 223 010 A1 may be used to conduct demolition works wherein a tool bit formed as a chisel is usually driven into the material of the work piece. In addition, it can be conceived that the hammer is configured as a hammer drill having a tool holder which is also rotationally driven. In this case a drill bit may be used as a tool bit rather than a chisel.

In such a hammer the ram is usually driven in such a way that in addition a piston is guided within the cylinder wherein an air cushion is provided between the piston and the ram. The piston is coupled with a crank drive so that the rotational movement of the motor shaft is converted into a reciprocating movement of the piston. This movement in turn is transferred to the ram via the air cushion, the ram hitting either directly the tool bit supported by the tool holder or a beat piece arranged between the ram and the tool bit wherein in both cases the momentum of the ram is transferred to the tool bit.

The magnitude of the momentum of the ram depends on the acceleration which has been received by the ram due to the movement of the piston. The velocity of the piston in the direction of the longitudinal axis of the cylinder depends in turn on the rotational speed of the motor shaft of the motor. As a consequence, the power of impact the ram applies to the tool bit, depends on the rotational speed of the motor and is relatively low if the motor runs at low speed. Further, in case of such a hammer changing the rotational speed of the motor is the only way for changing the power of impact of the ram. However, it may be desirable to provide an increased power of impact even at low rotational speed, if the hammer is used in the drill mode, i.e. the cylinder with the tool holder thereon is rotatingly driven.

Therefore, it is the object of the present invention to provide for a motor driven hammer which allows for a change of the power of impact which is transferred from the ram to the tool bit without the need for changing the rotational speed of the motor.

BRIEF SUMMARY OF THE INVENTION

According to the present invention this object is achieved in that the ram is made of a paramagnetic or ferromagnetic material or comprises a permanent magnet and a coil is arranged within the housing adjacent to the cylinder so that the coil applies a force in the direction of the longitudinal axis on the ram if a current is applied to the coil.

Since the ram is formed of a paramagnetic or ferromagnetic material or comprises a permanent magnet, the movement of the ram within the cylinder may be influenced by an outside magnetic field. As the coil is capable of producing such a field which in turn results in a force on the ram in the direction of the longitudinal axis of the cylinder, the movement of the ram may be selectively controlled by a current applied to the coil. It is not necessarily required to change the rotational speed of the motor but it may remain constant.

In order to effectively influence the movement of the ram, it is preferred that the coil surrounds the cylinder.

Furthermore, it is preferred that the cylinder is formed of a non-magnetic material such as aluminium. This results in a small shielding effect by the cylinder with respect to the magnetic field generated by the coil. A strong shielding would have the result that only a weakened magnetic field would influence the ram having only a small effect on the movement of the ram. However, a cylinder of non-magnetic material allows for the use of comparatively low currents for affecting the velocity of the ram.

In a preferred embodiment, the ram may have a forefront position in the cylinder in which position the ram has the shortest distance to the tool holder with respect to the longitudinal axis, and the coil is arranged between the forefront position and the tool holder. In this case, the coil may generate a force on the ram in the direction towards the tool holder even if the ram is in its forefront position. That means it is possible with the coil to accelerate the ram along its entire path to the forefront position adjacent the tool holder.

Alternatively, it may be conceived that the forefront position is located with respect to the longitudinal axis between the coil and the tool holder. In this case the coil may act to decelerate the ram when moving towards the forefront position. This allows to reduce the power of impact applied to the tool bit.

In a preferred embodiment, the hammer mechanism comprises a piston, which is guided within the cylinder wherein the piston is coupled with the motor in such a way that the piston reciprocates upon rotation of the motor shaft and wherein an air cushion is provided between the piston and the ram. In addition, a control unit is provided which is connected with the coil wherein the control unit is adapted to apply a current to the coil depending on the position of the piston within the cylinder. This configuration allows for example to apply a current to the coil at that time at which the ram is in the most rearward position so as to effect an additional acceleration in the direction of the tool bit In addition, in such an arrangement it is possible to apply a force on the ram when it moves backwards after having hit the tool bit and the beatpiece, respectively, the force acting in the same direction along which the ram moves. The effect is that the air cushion between the ram and the piston is further compressed by the rearwardly moving ram, and the ram will have a higher energy when it applies the next impact on the tool bit.

Furthermore, a current may be applied to the coil depending on the rotational speed of the motor. In particular at low rotational speeds, when the power of impact generated by the rotation of the motor is small, it is possible to effect an increased overall power of impact by additionally accelerating the ram due to the magnetic field of the coil induced by the current.

BRIEF DESCRIPTION OF THE DRAWINGS

An embodiment of a motor driven hammer according to the present invention will now be described by way of example with reference to the accompanied drawing in which:

FIG. 1 is a partly cut away side view of a motor driven hammer of the present invention.

DETAILED DESCRIPTION OF THE INVENTION

FIG. 1 depicts a motor driven hammer 1 according to the present invention. The hammer 1 comprises a housing 3 which includes a handle 5 being provided with and actuator 7 to activate the hammer 1. Inside the housing a conventional electric motor 9 is provided for driving the hammer 1 which motor comprises a motor shaft 11. At the free end of the motor shaft 11 a pinion 13 is rotationally fixed.

At the front end of the housing 3 a tool holder 15 is arranged which may support a tool bit, in particular a chisel bit or a drill bit, wherein the tool bit is rotationally fixed but axially moveable to a limited extent within the tool holder 15. The tool holder 15 is rotationally fixed to a cylinder 17 being rotationally supported within the housing 3. The cylinder 17 extends along a direction which defines a longitudinal axis L, and in the region of the front end 19 of the cylinder 17 a beat piece 21 is provided which is slidable in the direction of the longitudinal axis L wherein the end of the beat piece 21 facing the tool holder 15 may hit the rear end of a tool bit supported by the tool holder 15. The cylinder 17 may be formed of a non-magnetic material so that the shielding effect of the cylinder wall for an outside magnetic field is kept small. Moreover, inside the cylinder 17 a ram 23 is located which may reciprocate therein. If the ram 23 abuts with its front end on the beat piece 21, the ram 23 is in its forefront position. In addition, the ram 23 is made at least partially of a paramagnetic or ferromagnetic material or it is comprised at least partially of a permanent magnet.

Furthermore, at the rear end of the cylinder 17 a piston 25 is arranged which is slidable within the cylinder 17, and an air cushion 27 is formed between the piston 25 and the ram 23. Both the piston 25 and the ram 23 are provided with O-rings at the periphery, so that the volume forming the air cushion 27 is sealed with respect to the environment. Accordingly, a reciprocating movement of the piston 25 results in a similar movement of the ram 23 due to the sealed air cushion 27.

A piston rod 31 is pivotably coupled to the rear end of the piston 25 via a first trunnion 28 extending in the transverse direction with respect to the longitudinal axis L. The opposite end of the piston rod 31 is coupled to a shaft 35 via a second trunnion 33 which is mounted at an eccentric position with respect to the rotational axis of the shaft 35. Thus, the arrangement of the shaft 35, the second trunnion 33 and the piston rod 31 forms a crank drive which is capable of transforming a rotational movement of the shaft 35 into a linear movement of the piston 25. Finally, a gear 37 is fixed on the shaft 35 which gear meshes with the pinion 13 on the motor shaft 11.

A ring gear 39 is positioned on the outer periphery of the cylinder 17 wherein the ring gear 39 may be rigidly coupled to the cylinder 17 via a coupling mechanism so as to be rotationally fixed with respect to the cylinder 17. The ring gear 39 meshes with a bevel gear 41 mounted on an intermediate shaft 43 which comprises a gear 45 which in turn meshes also with the pinion 13 on the motor shaft 11.

Inside the housing a coil 47 is provided which in this preferred embodiment surrounds the cylinder 17. The coil is arranged in such a way that when the ram 23 is in its forefront position, the coil 47 is located between the tool holder 15 and the ram 23 with respect to the longitudinal axis L. That is to say the coil 47 is located in front of the ram 23 even if the ram is in its forefront position. In an alternative embodiment not shown here, in the forefront position, the ram may be disposed between the coil 47 and the tool holder 15. Furthermore, provision may be made to selectively adjust the position of coil 47 along the longitudinal axis.

Finally, the coil is electrically connected with a control unit 49 which may apply a current to the coil 47.

If the motor 9 is switched on via the actuator 7, the motor shaft 11 starts to rotate and the shaft 35 and the intermediate shaft 43 are rotatingly driven due to the engagement of the pinion 13 with the gears 37, 45. Since the piston rod 31 is eccentrically connected with the shaft 35, rotation of the shaft 35 results in a reciprocating movement on the piston 25. This reciprocating movement is transferred to the ram 23 via the air cushion 27 so that the ram 23 also reciprocates in the cylinder 17 along the longitudinal axis L. When moving in this way the ram 23 hits the beat piece 21 and, thus, impacts are applied to a tool bit supported in the tool holder 15.

If the ring gear 39 is rotationally fixed on the cylinder 17, rotation of the intermediate shaft 43 also leads to a rotation of the cylinder 17 and of the tool holder 15. However, if the coupling between the ring gear 39 and the cylinder 17 is released, the cylinder 17 does not rotate but remains stationary.

During operation of the hammer 1 the power of impact which is applied to the beat piece 21 by the ram 23 depends on the acceleration of the ram 23 resulting from the movement of the piston 25. The magnitude of this acceleration in turn depends on the velocity of the piston 25 and thus on the rotational speed of the motor 9.

By means of the coil 47 and the ram 23 which is formed of paramagnetic or ferromagnetic material or comprises a permanent magnet, the power of impact can additionally be influenced. Since the ram 23 is sensitive to a magnetic field and the coil 47 generates such a field, the ram 23 may be accelerated additionally. In particular, the magnetic field results in a force along the direction of the longitudinal axis L towards the tool holder 15 and, therefore, the power of impact of the ram 23 may be changed depending on the current which is applied to the coil 47 by means of the control unit 49, although the rotational speed of the motor 9 is kept constant.

In case the ram 23 comprises a permanent magnet, the direction of the force depends on the direction of the magnetic field generated by the coil 47 and thus on the direction of the current applied to the coil 47. On the one hand it is possible that the force acting on the ram 23 results in a deceleration of the ram 23, when the ram 23 moves towards the beat piece 21, and the power of impact is reduced compared to the case where no magnetic field is present. On the other hand, the magnetic field may produce an attractive force on the ram 23 with respect to the beat piece 21 so that an additional acceleration is effected and the power of impact is increased.

Furthermore, the power of impact may also be increased when a repulsive force is applied on the ram 23 when moving backwards. This results in a further compression of the air cushion 27 due to the rearwardly moving ram 23, and the kinetic energy of the ram 23 is increased when it moves towards the front next time.

In addition, the control unit 49 may receive a signal indicating the rotational position of the shaft 35 and the position of the piston 25 within the cylinder 17. This signal may be used to control the current applied to the coil 47. Here, it is possible to apply a current only at that time when the piston is in the most rearward position and starts to move towards the beat piece 21, while the coil 47 is not energised when the piston 25 and the ram move rearwards within the cylinder 17.

Furthermore, it is also possible that a signal indicating the rotational speed of the motor 9 is fed to the control unit 49 to control the current to the coil 47. For example, in case the motor 9 is operating at low speed, a high current may be applied to the coil 47 to increase the power of impact to an acceptable level compared to the situation in which the power of impact is merely the result of the slow movement of the piston 25.

In conclusion, the present invention allows for changing the power of impact of the hammer 1 in a simple manner without using complicated mechanical means although the rotational speed of the drive motor 9 may remain constant.

The invention claimed is:

1. Motor driven hammer comprising: a housing, a motor having a motor shaft and being arranged in the housing, a hammer mechanism including a cylinder in which a ram is arranged, the ram being slidable along a longitudinal axis of the cylinder and a tool holder which may support a tool bit so that the tool bit is aligned with the longitudinal axis of the cylinder, wherein the motor is coupled with the hammer mechanism, so that rotation of the motor shaft results in a reciprocating movement of the ram within the cylinder, the ram applying impacts on a tool bit supported by the tool holder during the reciprocating movement wherein, the ram is made at least partially of a paramagnetic material, a ferromagnetic material or a permanent magnet material, a coil arranged within the housing adjacent to the cylinder, a control unit connected with the coil, and wherein the control unit is adapted to apply a current to the coil so that the coil applies a force to the ram in the direction of the longitudinal axis of the cylinder during the reciprocating movement of the ram.

2. The motor driven hammer of claim 1, wherein at least a portion of the cylinder is formed at least partially of a non-magnetic material.

3. The driven hammer of claim 1, wherein the ram has a forefront position within the cylinder, in which position the ram is closest to the tool holder with respect to the longitudinal direction and wherein, with respect to the longitudinal axis, at least a portion of the coil is arranged between the forefront position and the tool holder.

4. The motor driven hammer of claim 1, wherein the ram has a forefront position within the cylinder, in which position the ram is closest to the tool holder with respect to the longitudinal direction and wherein, with respect to the longitudinal axis, the ram in its forefront position is located at least partially between the coil and the tool holder.

5. The motor driven hammer of claim 4, wherein the hammer mechanism comprises a piston, which is guided within the cylinder, wherein the piston is coupled with the motor in such a way that the piston reciprocates upon rotation of the motor shaft and wherein an air cushion is provided between the piston and the ram.

6. The motor driven hammer of claim 5, wherein the current depends on the position of the piston within the cylinder.

7. The motor driven hammer of claim 6, further including a sensor for sensing at least one of a position, velocity, and acceleration of at least one of the piston and the ram.

8. The motor driven hammer of claim 7, wherein the control unit receives a signal from the sensor and a current is applied to the coil depending on the signal.

9. The motor driven hammer of claim 5, wherein the control unit is adapted to apply a current to the coil depending on the rotational speed of the motor.

10. The motor driven hammer of claim 5, wherein the control unit is adapted to apply a current to the coil depending on the rotational speed of the motor and the and the position of the piston within the cylinder.

11. The motor driven hammer of claim 1, wherein the longitudinal position of the coil is adjustable.

12. Motor driven hammer comprising: a housing, a motor having a motor shaft and being arranged in the housing, a hammer mechanism including a cylinder in which a ram is arranged, the ram being slidable along a longitudinal axis of the cylinder and a tool holder which may support a tool bit so that the tool bit is aligned with the longitudinal axis of the cylinder, wherein the motor is coupled with the hammer mechanism, so that rotation of the motor shaft results in a reciprocating movement of the ram within the cylinder, the ram applying impacts on a tool bit supported by the tool holder during the reciprocating movement wherein, the ram is made at least partially of a paramagnetic material, a ferromagnetic material or a permanent magnet material, a coil arranged within the housing adjacent to the cylinder, a control unit connected with the coil, and wherein the control unit is adapted to apply a current to the coil so that the coil applies a force to the ram toward the tool holder during the reciprocating movement of the ram.

* * * * *